United States Patent [19]
Booth

[11] 3,915,116
[45] Oct. 28, 1975

[54] COMPACT BREADING MACHINE

[75] Inventor: Raymond E. Booth, Huron, Ohio

[73] Assignee: Sam Stein Associates, Inc., Sandusky, Ohio

[22] Filed: Apr. 10, 1974

[21] Appl. No.: 459,567

[52] U.S. Cl. .................... 118/16; 118/21; 118/26; 118/426
[51] Int. Cl.² .......................................... A21C 9/04
[58] Field of Search .......... 118/100, 13, 19, 24, 26, 118/30, 31, 16, 18, 21, 426, 20

[56] References Cited
UNITED STATES PATENTS

| | | | |
|---|---|---|---|
| 1,673,686 | 6/1928 | Kremmling | 118/21 |
| 1,957,961 | 5/1934 | Hunter | 118/20 |
| 2,731,942 | 1/1956 | Andersen | 118/16 |
| 2,855,893 | 10/1958 | Greer et al. | 118/24 |
| 3,045,640 | 7/1962 | Hill et al. | 118/16 |
| 3,738,313 | 6/1973 | Heim | 118/18 |
| 3,759,218 | 9/1973 | Korstvedt | 118/21 |
| 3,839,987 | 10/1974 | Bruschke et al. | 118/24 |

*Primary Examiner*—Mervin Stein
*Assistant Examiner*—Douglas Salser
*Attorney, Agent, or Firm*—Baldwin, Egan, Walling & Fetzer

[57] ABSTRACT

A machine is presented which includes a liquid-coating or battering unit above a dry-coating or breading unit, the units being useful separately or when combined as described. The battering unit includes a batter reservoir in which an open mesh wire belt under tension travels beneath a submerger wheel so as to gently nip the product and drag it below the surface of the batter. In the breading application unit, the loose breading material is stored in a hopper above which is flat slider plate over which passes an open mesh wire conveyor belt in its product-advancing run. This belt then passes downwardly, after discharging the coated product, to a lower point in the hopper where the belt is inclined upwardly toward the opposite end of the unit at the inlet end of the slider plate. This portion of the conveyor belt is the breading material elevating run and it travels close to an inclined bottom wall of the hopper. During the latter part of this run, the conveyor passes through a slot of limited dimensions which causes the conveyor belt to pump the breading material upwardly toward the product-advancing run where the dry material is pumped up from the elevating run to the product-advancing run through the wire mesh of the belt. A V-shape splitter then splits the upper portion of the breading material flow while providing a bed of this material of predetermined thickness on a central product path while diverting parts of the breading material flow laterally to both sides of the central path portion. The liquid-coated food product is placed on the central path portion downstream from the splitter and, as the product advances along the run above the flat slider plate two side plows, one each side of the product travel path, converge the breading material on each side of the path toward the center over the traveling product. Preferably, a tamper plate is provided to bear down on the breading material above the product to flatten out the breading material on top of and around the food product. A take-away conveyor is disclosed for discharging the coated product outside of the machine.

21 Claims, 19 Drawing Figures

COMPACT BREADING MACHINE

BACKGROUND OF THE INVENTION

There has long been a need in the field of commissaries, large restaurants, industrial and institutional kitchens, food specialty producers and pilot production plants for a small machine to batter and bread food items. Desirable features of such a small machine are: (1) A moderate amount of automation to save hand labor and to produce uniform results; (2) compact construction for use in kitchen areas rather than in plant production areas; (3) relatively low production capacity compared with available production machines; (4) simplicity of operation and maintenance; (5) versatility to handle many types of coating materials and many types of food products; utilizing sanitary construction materials and providing ease of clean-up. The present invention provides such a small, compact machine.

Among the objects of the present invention are included — (a) a liquid coating unit including a reservoir for the coating material, a submerger wheel having its lower periphery passing into the batter in the reservoir, a product carrying flexible wire mesh belt, tensioned by a counterweight and carrying the product beneath the submerger wheel and then up out of the batter where excess coating material is blown off, after which the product is passed downwardly to a breading unit; (b) to provide in a breading unit a single layer of dry breading material which is controlled so as to form both a receiving bread layer for the product and a top cover for the product; (c) to maintain dry breading material levels for a period of time by means of a built-in hopper; (d) to pump the dry coating material from the hopper through a slot which provides sufficient pressure to force the dry material upwardly through an open wire mesh conveyor belt to the breading run; (e) to drop the dry coated product sufficiently to flip off most of the excess dry coating material; (f) to transfer the coated product on a take-away conveyor out of the breading machine; and (g) to return the excess dry breading material back to the hopper.

Other objects and advantages of the invention will be apparent from the accompanying drawings and description and the essential features will be summarized in the claims.

In the drawings,

FIG. 4 is a side elevational view of one of two parallel vertical conveyor support plates positioned on opposite sides of the flexible wire mesh conveyor belt of the breading unit;

FIGS. 5 and 6 are respectively top plan and side elevational views of a tamper plate seen in broken lines at the upper mid-portion of FIG. 1;

FIGS. 7 and 8 are respectively top plan and side elevational views of the splitter seen at the left end of FIG. 2;

FIGS. 17 and 18 are respectively end and side elevational views of the belt reverser members; while

Figures 9, 10, 11, 12, 13, 14, 15, 16:
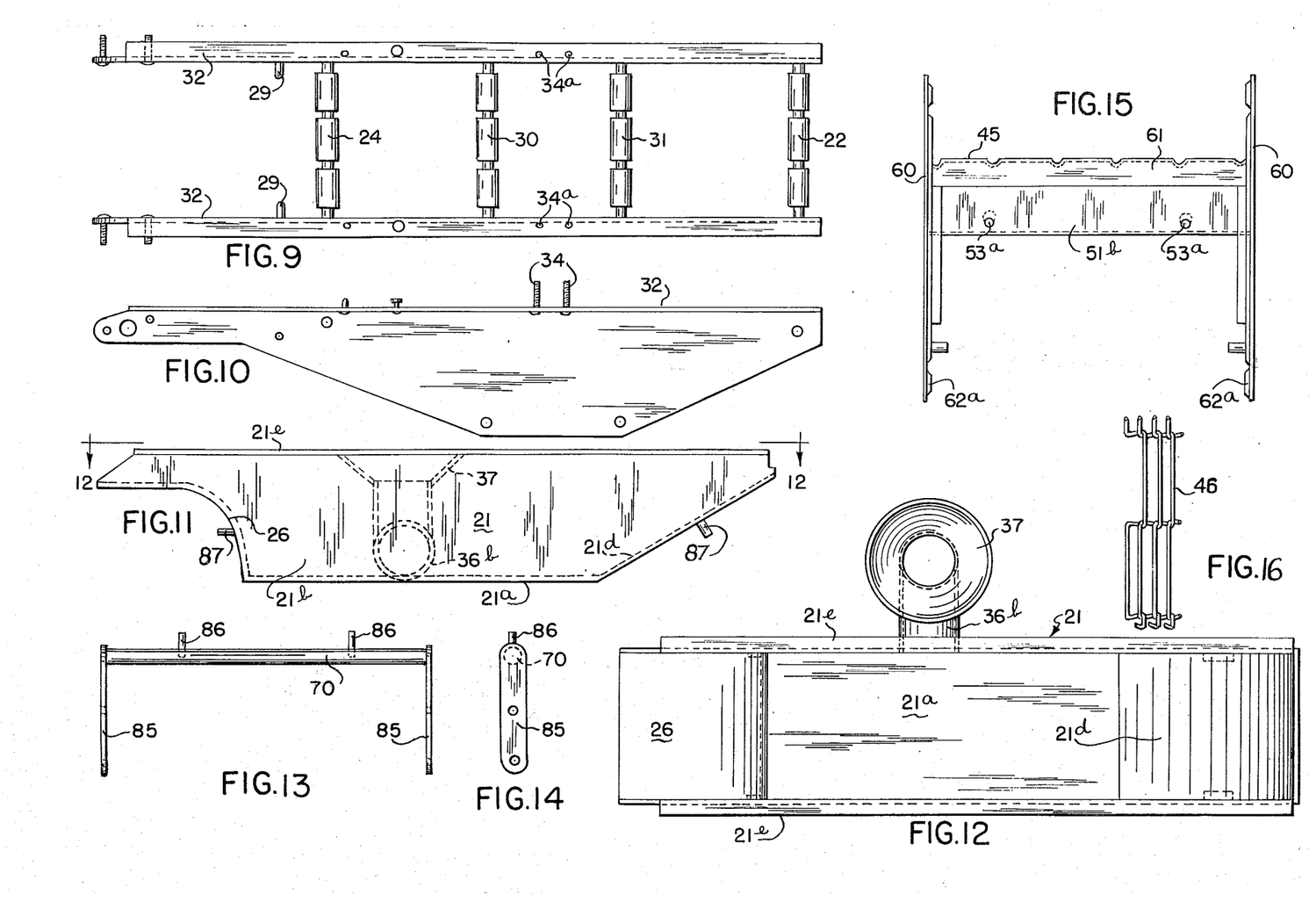
FIGS. 9 and 10 are respectively top plan and side elevational views of the conveyor belt frame used in the liquid-coating unit.
FIGS. 11 and 12 are respectively side elevational and top plan views of the batter reservoir of the liquid-coating unit.
FIGS. 13 and 14 are respectively side elevational and end views of the batter tank supports which hold the batter reservoir in position above the breading-coating unit.
FIG. 15 is an end view of a conveyor frame comprising two of the support plates shown in FIG. 4.
FIG. 16 is an enlarged view of the open mesh flexible wire belt described herein.

A preferred form of the open mesh flexible wire conveyor belt used in this invention, and shown in FIG. 16, is one made under the trade name "Flat-Flex" by the Wire Belt Company of America. Other similar conveyor belts may be suitable for use in this invention.

Figure 1:
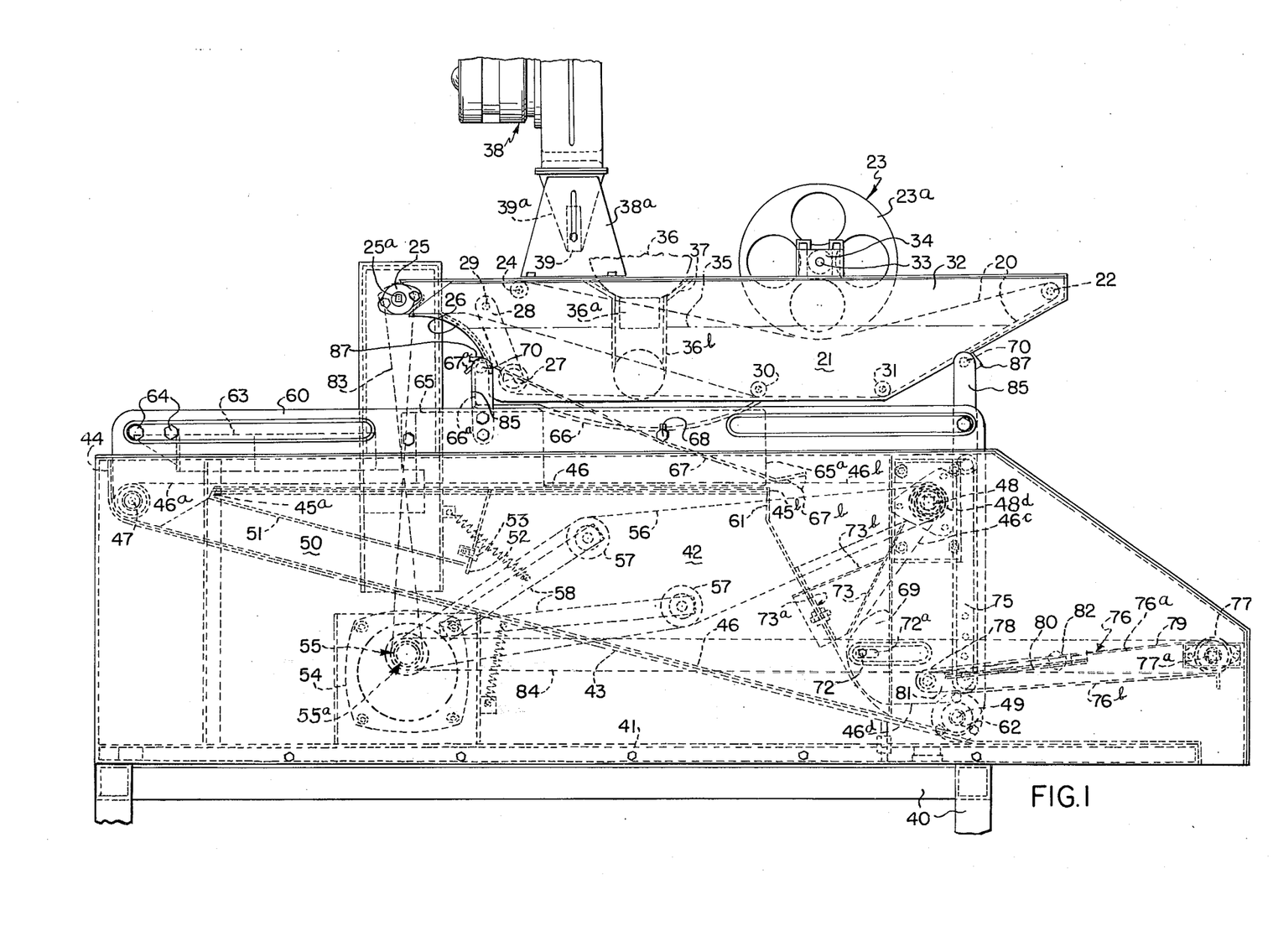
FIG. 1 is a side elevational view of the liquid-coating unit removably supported above the dry-coating unit in a preferred form of the invention.
Figure 2:
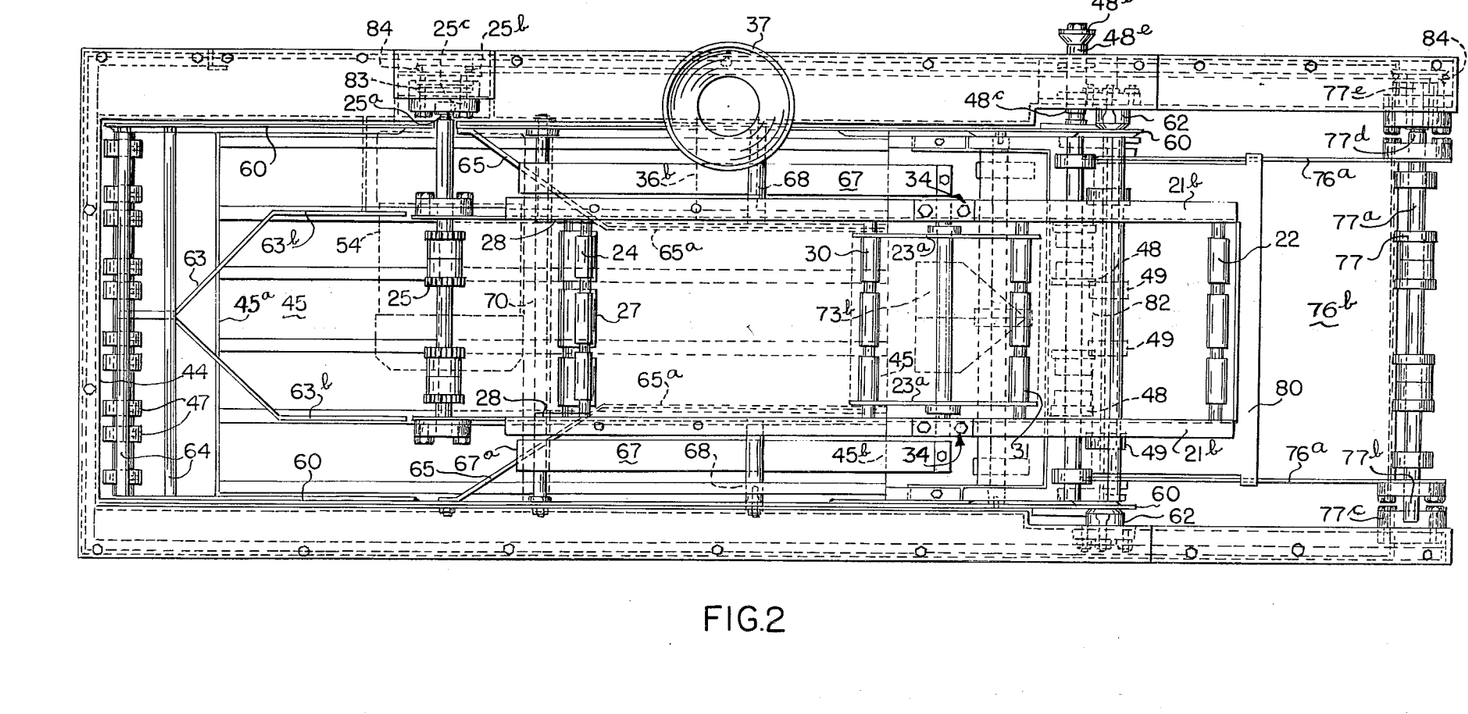
FIG. 2 is a top plan view of FIG. 1.
Figure 3:
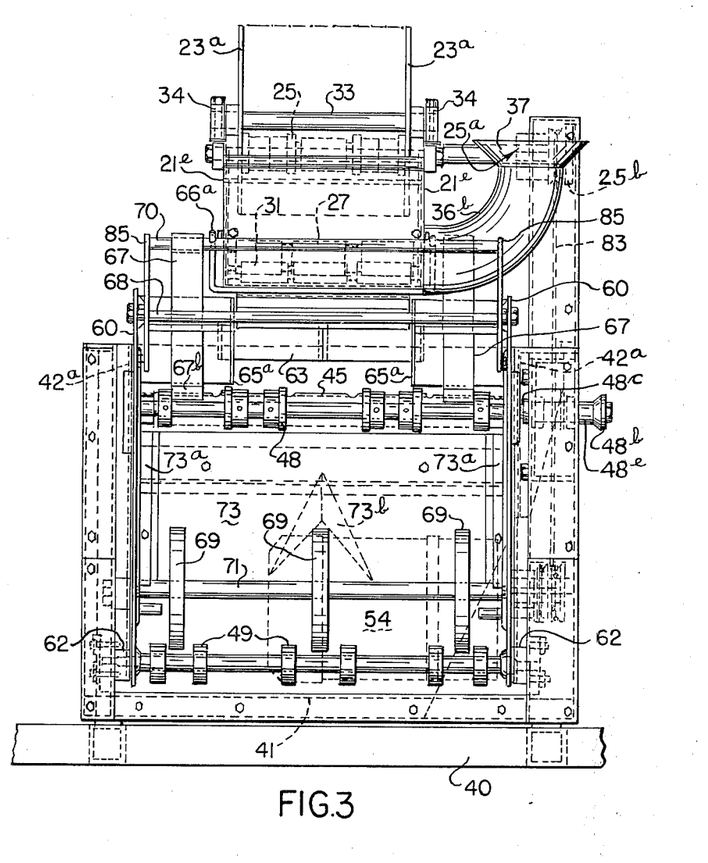
FIG. 3 is an end view taken from the right-hand end of FIG. 1.

The conveyor belts shown in broken lines in FIG. 1 are omitted from FIGS. 2 and 3 for clarity.

Referring to FIG. 1, the open mesh wire conveyor belt 20 is supported on a conveyor frame as shown in FIGS. 9 and 10 which in turn is supported in the batter reservoir 21 shown in greater detail in FIGS. 11 and 12. The drawings indicate that the belt 20 extends substantially from side to side of the reservoir when the conveyor is in its operating position.

The belt 20 is endless and passes over a pulley-equivalent or cross rod 22 at the product-inlet end of the liquid-coating unit, then beneath a submerger wheel 23, then over a cross rod 24, then over a drive pulley 25, then inwardly and downwardly over the curving plate 26 of the batter reservoir and beneath a counterweight 27 which is suspended by oscillatable arms 28 from pivot points 29 secured to the conveyor frame and the return run of the conveyor then passes beneath cross rods 30 and 31 back to the first named pulley equivalent or cross rod 22. The cross rods 22, 24, 30 and 31, are fixed in conveyor side walls 32. The drive pulley 25 is rotatably supported in the conveyor side walls 32.

The sumberger wheel 23 comprises two flat end disks 23a rigidly secured in spaced relation to a central shaft 33 and encased in a cylindrical covering of open mesh material, preferably the Flat-Flex open mesh material used in the conveyor belt 20. The shaft 33 is rotatably mounted in a pair of bearings 34 mounted respectively at 34a on the side frame members 32.

The batter tank or reservoir 21 is shown in FIGS. 1, 2, 11 and 12. It comprises a flat bottom 21a, parallel side walls 21b, a curved end wall 26 and an inclined end wall 21d. Each side wall has an outwardly turned flange 21e on which rests the conveyor frame members 32.

The batter tank is filled to a desirable level indicated by the dot-dash line 35 in FIG. 1. The lower portion of the submerger wheel extends preferably about one-half inch below the level of line 35. It will be obvious that as the food product moves through the liquid batter, batter is continuously removed as a coating on the product. To reduce the frequency of manually replenishing the batter supply, a jug of batter indicated at 36 is provided with a downwardly turned neck 36a which is held at the level of line 35 while a curved tube 36b which communicates at one end with tank 21 and carries at its other end a bowl 37 in which the jug 36 may rest. Thus, as the level of batter in the tank 21 falls, the jug replenishes the liquid as necessary to maintain it to the level of the line 35.

It will be seen from the above description that the liquid coating belt 20 starts at cross member 22 above the level of the batter material in tank 21, then passes under the submerger wheel 23, and then returns to the original level at cross member 24. Due to the tension caused by counterweight 27, the top run of belt 20 will always be as close to the batter surface as permitted by the submerger wheel and any product carried under it. The top of the food product is always submerged to the same level below the batter surface. Thus, as soon as food product clears the submerger wheel, belt tension returns the belt to a minimum slope out of the liquid batter material, decreasing the possibility of product slip back down the slope. The tension caused by the counterweight 27 insures a positive nipping action between the belt and the wheel, to actually drag the food product under the liquid batter surface even against any flotation force.

As the top run of the liquid coating belt rises out of the liquid batter after passing beneath the submerger wheel, it passes under a slotted discharge of a small air blower 38, the slot being shown at 39, formed by the sloping walls 39a and extending transversely to the direction of travel of belt 20. The air blower is supported at 38a on the conveyor frame 32. Thus, a downwardly directed air curtain sweeps the excess liquid batter off the top of the product. Sweeping is assisted on most products by the fact that the product is on a sloping belt. The blower 38 is adjustable in height and in air volume. At the top of the slope, the belt 20 passes over the horizontal cross rod 24 and since this rod does not rotate, any liquid batter drops here for return to the liquid batter pool.

It should be noted that the structure described causes continuous agitation of the liquid batter in the reservoir or tank 21. The return run of conveyor belt 20 passes from the drive pulley 25 over the curved end wall 26, close to the wall, and then from counterweight 27 it travels close to the bottom wall 21a under cross rods 30 and 31 and then up the sloping wall 21d back to the cross rod 22. This gives a continuous wiping effect of the belt conveyor 20 on the bottom and end walls of the tank 21, and the continuous motion of the belt through the liquid has a stirring and turnover effect for continuous mixing. Also, the submerger wheel 23 is rotated by the passage of the product under it on belt 20 and this gives further agitation to the liquid batter.

It will be noted from this description that the liquid-coating unit might be used to coat a food product with batter whether or not it were combined with the dry-coating unit which will next be described.

The dry coating unit is best understood from FIGS. 1, 2 and 3. A stand 40 supports a base plate 41, on which rests all parts of the breading machine unit now to be described. Briefly, this structure includes a breading material storage hopper 42 having an inclined bottom 43 between two parallel vertical side walls 42a, a short end wall 44 and a partial top wall comprising a slider plate 45 which is generally flat and horizontal. A continuous open mesh wire conveyor belt 46 has a breading material elevating run traveling upwardly toward the left as viewed in FIG. 1 close to the inclined bottom wall 43, then passing over an idler pulley equivalent 47, then horizontally in a product-advancing run horizontal and close to the slider plate 45, then over drive pulley 48 and then downwardly on a transfer run around belt reverser 69 and over an idler pulley equivalent 49, near the product-take-away point, and then turning upwardly on the elevating run again.

Figures 4, 5, 6, 7, 8, 17, 18:
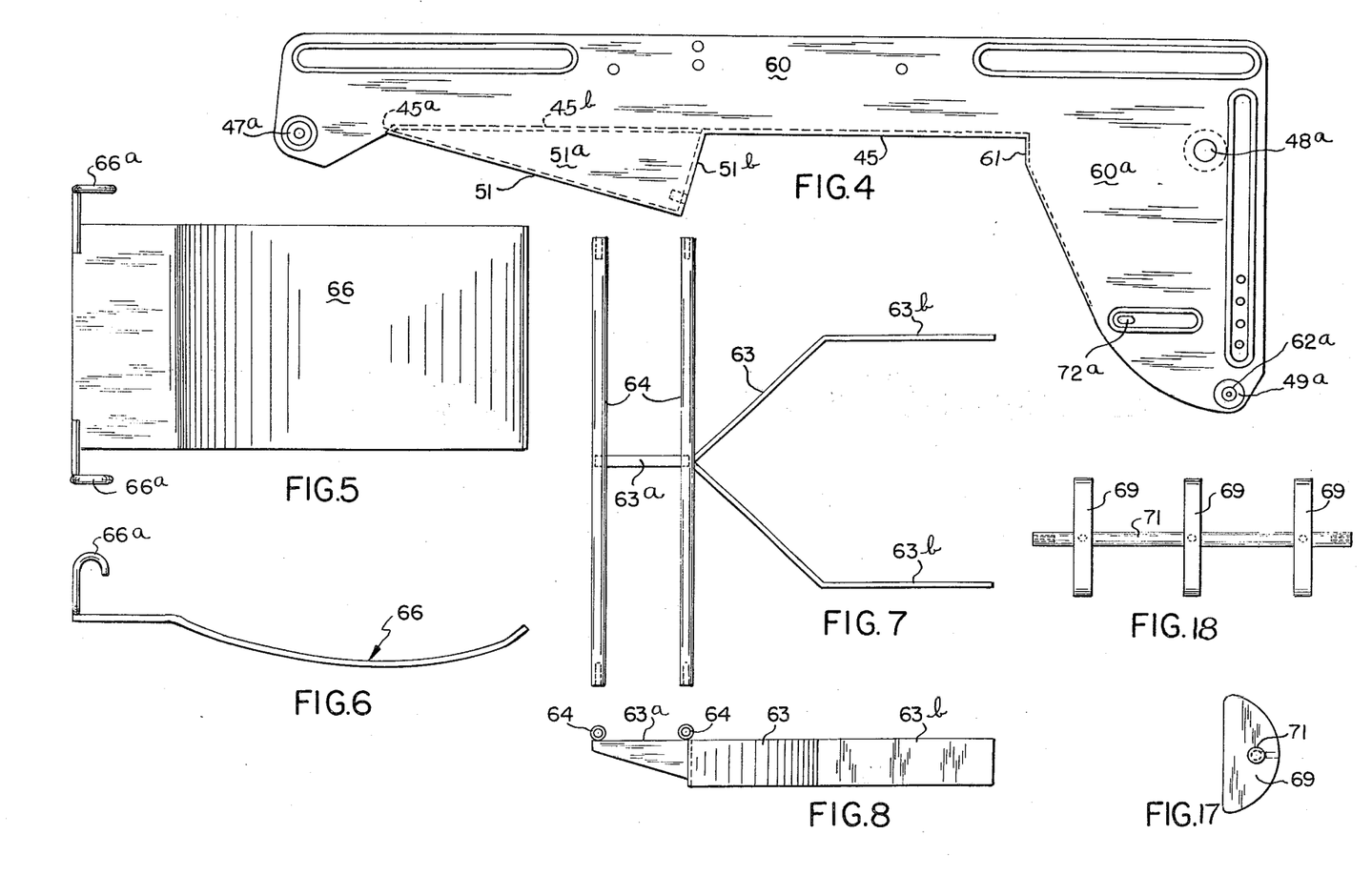

One of the novel features of this invention is the "pumping" slot indicated at 50. This slot is enclosed by a roof 51 which is spaced above and parallel to the slanting bottom wall 43, and has as side walls the two side walls of the hopper 42. The opposite ends of the slot are open and the roof 51 is connected by side walls 51a to the slider plate 45 as seen in FIG. 4 and the right-hand end of the plates 51 and 51a, as seen in FIGS. 1 and 4, is closed by a plate 51b. The height of the slot 50 is preferably approximately one and one-half times the maximum thickness of breading material desired on the product receiving portion of the conveyor belt above the slider plate 45. Preferably also, means is provided for adjusting the effective height of the slot which in the drawings includes a rectangular plate 52, seen in FIG. 1, which is adjustably held by one or more screw connections 53. The suitable height and length of slot 50 will be discussed later.

The means for driving the belt 46 comprises an electrical motor 54 mounted on the base plate 41 and having a drive sprocket 55 which is connected by drive chain 56 with the drive sprocket 48d on stub shaft 48e. Take-up idlers 57 on spring loaded oscillatable arms 58 permit the main drive chain 56 to slip on the motor sprocket 55. In this particular installation, the motor sprocket teeth are cut down below the pitch diameter and in normal operation will drive the drive sprocket 48d. However, if excess load is introduced onto the main breader belt 46, such as a jam of some sort, the chain jumps the motor sprocket until the load is relieved. In normal operation, the idlers 57 take up slack in the drive chain 56. The motor 54 is reversible for a purpose which will appear later.

The level of the breading material in the hopper 42 is normally above the entrance to the slot 50. The belt conveyor 46 traveling upwardly through the slot pumps the breading material upwardly to the pulley equivalent 47. The spacing between the periphery of this pulley and the hopper walls 43 and 44 is approximately the thickness of belt conveyor 46. The movement of belt 46 piles up the breading material against the pulley equivalent 47 and forces it upwardly through a breading entrance at 46a which is between the pulley equivalent 47 and the upstream end 45a of the slider plate. The breading material at this point wells up through the open mesh belt at 46a to a predetermined height as will presently appear.

Referring to FIGS. 1, 4 and 15, much of the operating structure of the breading machine is supported by a frame clearly shown in FIGS. 4 and 15. This includes as a unitary structure two parallel vertical conveyor support plates 60 which extend the full length of the product-advancing run of the belt conveyor 46. As clearly seen in FIG. 15, these support plates are connected rigidly by the slider plate 45, by a short vertical wall 61, by a short vertical wall at 45a and by the wall 51b. The openings 53a in the plate 51b are to receive the adjustment screws 53 which hold the slot height adjustment plate 52. Between the two support plates 60 are mounted the upstream pulley equivalent at the location 47a, the downstream drive pulley at the location 48a and a third pulley equivalent 49 at the location 49a. The support plates have parallel vertical downwardly extending ears 60a at the right-hand end thereof as seen in FIGS. 1 and 4 and these ears extend down to support the cross rod or pulley equivalent 49. Pivot pins 62a concentric with the pulley equivalent 49 oscillatably support the two ears 60 in the side walls of hopper 42, whereby the unitary structure thus disclosed may oscillate about the pivot pins for inspection and cleaning of the machine. The additional breading material control members are mounted along the upper edge of the two vertical conveyor support plates 60 as described in the next paragraph.

Means is provided for splitting the upper portion of the flow of breading material which is pushed upwardly through the breading entrance in the upstream space at 46a. This means is a V-shape, bent bar splitter 63, best seen in FIGS. 2, 7 and 8. This structure diverges from a nose 63a which is welded to two support rods 64 which are rigidly secured crosswise between the support plates 60. The splitter has parallel trailing legs 63b extending in the direction of product travel from the respective ends of the V-shape member 63. The trailing legs of the splitter encompass a product travel path along the belt conveyor 46 which is wide enough to encompass the product intended to be coated and which is approximately half as long as the longest product intended to be coated. It will be noted in FIG. 8 that the lower edge of the splitter is planar and at the level of the desired thickness of breading material beneath the product of the product-advancing run of the conveyor belt 46.

It has been mentioned previously that the dry breading material wells up at 46a across the entire width of the conveyor belt 46. The splitter is in the central portion only of this path and diverts breading material laterally to each side above the level of the lower edge of the splitter. Means is provided for moving substantially all of this laterally diverted breading material on both sides of the product path, laterally inward from both sides onto the top of the product traveling along the conveyor belt 46. This means comprises two side plows 65, best seen in FIG. 2. One of these is on either side of the product path and each side plow has a converging portion extending from approximately a lateral edge of the slider plate 45 downstream and inwardly to approximately a colinear position with one of the splitter trailing legs 63b, and there is provided a trailer portion 65a extending downstream from the end of each plow parallel to the product path down to the product-discharge end of the slider plate 45b. Each trailer portion 65a is rigidly supported from a support member 60 by a stub tube 68. Each of these plows has a height extending from slightly above the slider plate 45 to a level above the breading material to be spread laterally inwardly over the food product and which is carried by the belt conveyor on the product-advancing run and between the side plow trailer portions.

The trailing legs 63b of the splitter are approximately one-half of the length of the longest product intended to be coated but may vary from 20 percent to 30 percent with various designs of the machine. The ends of the splitter trailing legs 63b are approximately in the same cross sectional plane where the side plows 65 start to leave the sides of the main conveyor frame 60. Side plow trailing legs are long enough to provide a predetermined product dwell time in breading at the predetermined belt speed. In one embodiment, the dwell time is approximately 6 seconds at a belt conveyor speed of 15 feet per minute.

To insure full coverage of the food product, preferably a tamper plate 66, best seen in FIGS. 1, 5 and 6, is floated on top of the dry breading material in the product path. This plate is pivoted horizontally on its upstream edge so that it is free to follow any fluctuations in the dry breading material thickness. It is nominally as wide as the product path, with clearance so that it will freely float between the side plow trailer portions 65a. It is long enough to reach the trailing edge of the slider plate 45 at 45b. Its side elevation as seen in FIGS. 1 and 6 is such that the main pressure line on the dry breading material is usually less than about one-half its length from its pivot. The plate is here shown as pivoted on two hooks 66a which are rigidly secured to the upstream edge of the plate 66. As shown in FIG. 6, the major portion of the plate 66 is concave upwardly so that it floats smoothly on the breading material. The hooks 66a hang on a cross bar 70, seen in FIGS. 1, 13 and 14, and which will be described later.

In the case of some flour coatings, which tend to bridge over the openings in the wire mesh conveyor 46, simple vibrators actuated by the passage of the conveyor belt 46 assist in its removal of excess dry breading material. As shown in FIGS. 1 and 2, two long flat vibrator blades 67 are provided, each with an integral bent portion on the upper end at 67a, which is hooked over cross bar 70. Each blade passes under a stub tube 68. This supports the vibrator blades in the inclined position shown in FIG. 1. The triangular block 67b rigidly fastened to the lower end of the blade 67 engages the cross wires of the conveyor belt 46 as they pass, and resultant vibration shakes the excess dry breading material through the belt 46 at breading exit 46b. Vibration effect may be increased or decreased by varying the shape of the blades before inserting it in the machine.

After passing over the drive pulley 48, the endless conveyor belt 46 turns downwardly approximately 120° over the drive pulley shaft, in the transfer run 46c. The belt then bends approximately 120° around a belt reverser shown in FIGS. 17 and 18, which, in this case, comprises three half-moon shape members 69 which are rigidly pinned to a rod 71 which is firmly held by bolts 72 at each end to the parallel side walls of the conveyor support members 60. The bolts 72 are horizontally adjustable in slots 72a. The belt 46 then has a short horizontal run 46d over to the pulley equivalent 49 where a 195° turn brings the belt conveyor 46 back to the breading material elevating run along the bottom of the bread hopper 42.

The material dropping through the conveyor belt 46 at the breading material exit 46b drops downwardly into the breading material hopper 42. To spread this material fairly evenly over the elevating run of the conveyor belt 46, there is provided a plate inclined downwardly and inwardly as shown in FIG. 1 at 73. This is secured to the conveyor support members 60 by a pair of flanges 73a. In the center of the plate 73 there is rigidly secured an inverted V-shape roof 73b, seen in FIGS. 1 and 3, and the result of this structure is to cause the material dropping at 46b to be spread rather evenly across the elevating run of belt 46.

When the coated product reaches the drive pulley 48 it falls downwardly to a take-away point 75 indicated in FIG. 1, which is just above the pulley equivalent 49.

This fall should be sufficient to permit the food product to flip over so that any excess material which is on the top of the product is dumped off. In the embodiment shown in the drawings, this distance is approximately 6 inches. At the take-away point, the product falls on a take-away conveyor 76 which comprises two parallel vertical side frame members 76a which are rigidly connected together by a flat slider bottom 76b which is fixed to the lower edges of the two side frame members 76a. The side frame members 76a at their outer ends rotatably support a drive pulley 77, whose shaft 77a is rotatably mounted in the side frame members. At their inner ends, the side frame members support a pulley equivalent 78 which serves as an idler for the endless open mesh wire conveyor belt 79 which passes over drive pulley 77 and the pulley equivalent idler 78. At the take-away point 75, a shallow tray 80 may be provided if desired. This tray catches loose breading material falling from the pulley 48 and from the food product falling downwardly therefrom and provides a relatively thin layer of dry breading material under the belt 79. Thus, when the food product falls onto the belt conveyor 79, it is cushioned by this layer of breading material and "printing" of the wire belt in the dry coating of the product is minimized. The tray 80 is below the upper run of belt 79 and above the return side of the belt which travels close to the slider bottom 76b. All dry breading material falling down the conveyor belt 79 is carried by the return run of the belt conveyor along the slider bottom 76b to the point 81 where it falls through the short horizontal run 46d shown in FIG. 1 of the conveyor belt of the breading machine and is thereafter carried into the hopper 42 and up the elevating run of the conveyor belt 46. If desired, one or more triangular shaped buttons 82 may be secured to the tray 80 in position to project above the top layer of the belt 79 and afford a small amount of vibration to assist flour type breading material in falling through the conveyor belt 79. The finished breaded product drops off the drive pulley 77 and is carried away for further processing.

Figure 19:
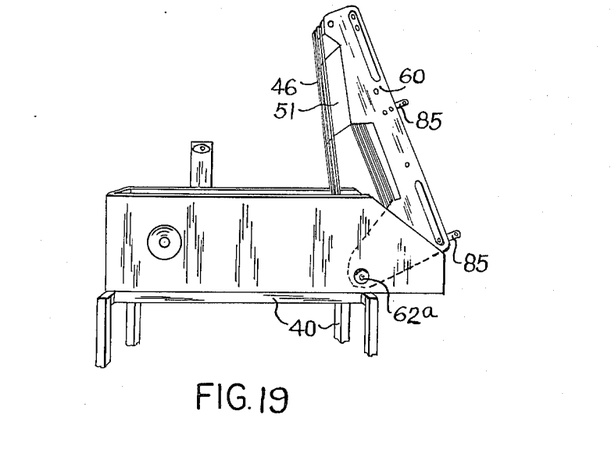
FIG. 19 is a small perspective view showing the side frame support members 60 and attached parts tilted around pivots 62 for cleaning and inspection.

For purposes of cleaning and inspection, the endless conveyor belt 46, its side frame support members 60, the drive pulley 48 and pulley equivalents 47 and 49, and all parts supported along the upper edges of the side frame support members 60 are preferably mounted so as to open upwardly about a pivot point 62 concentric with the pulley equivalent 49, when the batter coating unit is removed from the position shown in FIGS. 1 through 3. Such a rotated position of these parts is shown in FIG. 19 and this leaves exposed for cleaning the inclined bottom wall 43 of the hopper 42, and all of its side walls. The pivot connections for the ear portions 60a comprise frusto-conical members 62a clearly seen in FIGS. 4 and 15 which fit snugly with complementary members 62 fixed in the side walls of the hopper 42.

The inclined angle of the slider plate 45 in such open position, in this embodiment, is about 30° short of the vertical.

The drive motor 54 has previously been mentioned as being a reversible electrical motor which drives the motor sprocket 55 as clearly seen in FIG. 1. A drive belt 83 runs vertical upwardly from a drive pulley 55a on the motor shaft and passes around the drive pulley 25b mounted on the stub shaft 25c of the liquid battering unit as shown. Another drive belt 84 runs horizontally from a suitable drive pulley on the motor shaft to a drive pulley on stub shaft 77e to run the take-away conveyor 76.

It should now be noted that the dry breading material coating belt 46 may be reversed so as to empty the breading hopper 42 at the end of a day's run. During such an operation, the elevating run of the belt 46 is reversed and carries the material downwardly along the inclined bottom 43 and out of the hopper 42 beneath and over the pulley equivalent 49 as seen in FIG. 1. In the embodiment shown in the drawings, only about 30 cubic inches of dry breading material remain in the bread tank after this self-emptying operation.

Referring to FIGS. 1, 13 and 14, in the use of the combined liquid coating and dry coating units as shown in FIGS. 1, 2 and 3, the liquid coating unit is held by similar structure at opposite ends of the batter reservoir tank 21. Each of these units comprises a pair of parallel vertical rigid struts 85 rigidly bolted or otherwise fastened to the side conveyor frame members 60 and connected across the tops thereof by the rods 70 previously mentioned. Pins 86 on the rods 70 fit relatively snugly on opposite sides of the batter reservoir 21 to hold it firmly in position. The rods 70 engage against pins 87 which extend outwardly from the front and rear end walls of the batter reservoir 21 as clearly seen in FIG. 1. It should be noted that at each drive shaft 25, 48 and 77a a stub shaft is used with an axially centered square socket, into which are plugged the square shouldered drive shafts for each of the conveyors.

To disconnect the batter coating unit so as to remove it from the position above the dry bread coating unit, it is only necessary to tilt the reservoir 21, containing conveyor 32, free of the pins 86 in cross bars 70, and pull the axially centered square shouldered drive shafts 25 out of the axially centered square socket in the stub shaft at 25a, after which the batter coating unit can be lifted away.

To disconnect the take-away conveyor 76 so as to remove it from the dry coating unit, it is only necessary to rotate the take-away conveyor 76 upwardly about 90° around shaft 77, then lift the free end 77b of shaft 77 out of saddle bearing 77c, and then to pull the axially centered square shouldered drive end of shaft 77a out of the axially centered square socket at 77d, after which the take-away unit can be lifted away.

To disconnect the drive mechanism for belt 46, it is only necessary to pull knob 48b in the direction away from the back cover of the machine, which will pull the axially centered socket of the stub shaft 48e off of the axially centered square shoulder of shaft 48 at 48c. The entire conveyor belt 46, its side frame support 60, the drive pulley 48 and pulley equivalents 47 and 49 may now be opened upwardly about a pivot point 62 as previously described.

It should now be clearly understood what the operation of the complete apparatus is. With the upper unit filled with batter to the level 35 and with the breading material hopper 42 filled with breading material beyond the point 52 at the entrance to slot 50, the motor 54 is actuated until breading material is spread along the slider plate 45 controlled by the splitter 63 and the side plows 65 as above described. Pieces of food product to be coated are then placed on the conveyor belt 20 inside of the batter reservoir 21 and the conveyor belt will then carry the food product to beneath the submerger wheel 23 and the air discharge slot 39 to fall over the pulley 25 onto the breading layer beneath the splitter 63. This fall is sufficient to cause the product to imprint itself somewhat into the uniform layer of breading material into which it falls. Then, as the product travels the path carried by the conveyor belt 46, the side plows 65 will spread the excess breading material laterally inwardly in both directions over the top of the product where the material will be flattened down and pressed into the product by the tamper plate 66. Then the excess breading material will fall through the conveyor belt at 46b, after which the product falls over the drive pulley 48 downwardly to the take-away conveyor 76 which carries it over the drive pulley 77 as a finished breaded product.

The liquid-batter coating unit will apply coatings varying from water thin to the thickness of heavy cream. The dry bread coating section will handle and apply finely divided dry materials including free flowing, granular and flour types, usually called "breading" by the trade. With slight modification, it will also handle granulated crystallized sugar, and other dry coatings.

Parts which may be coated by the described apparatus include fish portions and sticks and fillets, shrimp, cut-up chicken parts, meat patties, pork chops, veal cutlets, as well as such as oysters, clams, scallops, doughnuts and other bakery items, etc.

The path shown in the drawings of this embodiment might be varied without effectively changing any of the machine functions. For instance, the battering unit could be reversed around the drive pulley 25 so that the product advanced from left to right as seen in FIG. 1 through the battering unit, then falling downward to the breading unit and continuing in the same straight line to the finish. Other rearrangements of the units are possible by those skilled in this art.

The size of the machine shown is not critical. The product path may be narrower or wider. The machine may be longer or shorter, faster or slower. The dry breading material elevating slope may be steeper or shallower. The parallel wire spacing of the Flat-Flex type of belt may be changed to suit the food product and the dry material being used. Flip distance may be increased or decreased. Dimensions of the slot 50 may be varied considerably when other factors are also changed, or when induced results are acceptable.

The machine described will accept a regular or intermittent flow of food products at the inlet to the liquid batter coating section and will then completely liquid coat the product; remove excess liquid from most surfaces thereof; transfer the product to a dry breading coating section; completely coat the product with the dry breading material; tamp the dry material on the product; remove excess dry material from all parts of the product; and deliver the product to another conveyance for further action.

The machine described will continuously sift out large chunks of dry breading material which have been matted by contact with batter material.

It will have been noted that the machine dismantles for cleaning without tools. Removable parts are light enough to pose no lifting problems to anyone, and small enough to wash in a sink. The main breading hopper 42 and the dry coating conveyor 46 remain attached together with one end of the conveyor pivoted up to a safe stable point as shown in FIG. 19. This part could be washed on a counter so that the water drains into a sink, or if on a movable cart, could be washed in a large equipment washroom. High pressure hoses will not damage any components of the machine.

When compared to the smallest commercial machine presently available, the machine presented herewith utilizes about one-third of the conveyor belt area per minute, or about one-half the total conveyor belt length, and thus the capacity of the machine is about one-third to one-half that of the next smallest machine of comparable versatility.

The embodiment described herein is only 17 inches wide by 43 inches long by 18 inches high, and weighs 120 pounds complete. This may be compared with production type machines up to 5 feet wide by 15 feet long by 8 feet high and weighing 1800 pounds.

The machine presented herewith has very few adjustment points to regulate, and poor regulation is not usually a serious factor in use of the machine. Wear point are not critical and are easily replaced, rather than having to be adjusted. All replacement conveyor belts can be endless when received from the factory, so that special training is not necessary to lace them together. The machine dismantles for cleaning without the use of tools, and all surfaces are accessible for scrubbing. When open for cleaning, all belts are free wheeling for ease of cleaning, because the axial square socket connections and stub shafts on all of the driving pulleys permit all product driving pulleys to be disconnected from the power source.

What is claimed is:

1. A machine for coating a food product with a finely divided particulate coating material comprising (1) means providing a moving belt; (2) means providing a flow of said coating material on top of said moving belt which provides a product path centrally thereof; (3) means for splitting the upper portion of said flow and providing a bed of said material of predetermined thickness on said central product path while diverting parts of said material flow laterally to both sides of said central path portion; (4) means placing a food product on said central bed portion; (5) said moving belt advancing said product and said coating material down said path while (6) means is provided for moving substantially all of said coating material on top of said belt on both sides of said product path laterally inward from both sides onto the top of said product; (7) means tamping said coating material on top of and around said product; (8) means removing excess of said coating material from over, under and around said product and returning it for re-use; and (9) discharging said coated product at the end of said path.

2. A unitary compact breading machine as defined in claim 1, wherein said means (1) comprises a frame; a generally flat slider plate horizontally fixed in said frame and having a product-input end and a product-discharge end; an open mesh wire conveyor belt having a product-advancing run extending linearly close above said slider plate and supported in said frame by pulley equivalents, one spaced upstream from said input end and providing a breading entrance in said upstream space, and one spaced downstream from said discharge end and providing a breading exit in said downstream space; said means (2) comprises a breading material storage hopper on said frame below said slider plate and having parallel side walls and having a bottom wall which is a flat plate inclined upwardly from a product-take-away point spaced below said downstream pulley to a point immediately below said upstream pulley equivalent and having one end wall at the higher end of said bottom wall; said conveyor belt having a linear breading material elevating run in said hopper and traveling close to said inclined bottom wall; said elevating run supported by a third pulley equivalent at said product-take-away point and by said upstream pulley equivalent; said means (8) includes said conveyor belt having a transfer run extending between said downstream pulley and said pulley equivalent at said product-take-away point; said means (2) also comprises a flat roof plate fixed in said hopper parallel to said bottom wall and spaced thereabove at approximately the level of the top of the breading material being elevated by said conveyor belt, said roof terminating at approximately said product-input end of said slider plate, said roof plate extending between said hopper side walls and with said hopper bottom wall forming a slot which with said belt conveyor elevating run serves to pump said breading material forward and upward; said means (3) includes a V-shape bent bar splitter suspended from said frame above the product-input end of said slider plate, the lower edge of said splitter being planar and at the level of the desired thickness of breading material beneath the product on said product-advancing run of said conveyor belt, said splitter having parallel trailing legs extending in the direction of product travel from the respective ends of said V-shape; said means (6) comprises two side plows fixed to said frame slightly downstream from said splitter trailing legs, one on either side of said product path, each side plow having a converging portion extending from approximately a lateral edge of said slider plate downstream and inwardly to approximately a colinear position with one of said splitter trailing legs and there having a trailer portion extending downstream parallel to the product path to the product-discharge end of said slider plate, each said plow having a height extending from slightly above said slider plate to a level above the breading material carried by said belt conveyor on said product-advancing run and between said side plow trailer portions; and said means (1) also comprising means for driving said conveyor belt to cause said breading material elevating run to move up said hopper bottom wall and to cause said product advancing run to move product toward said product-discharge end; whereby breading material in said hopper is elevated up said hopper bottom and pumped through said slot to a point adjacent said upstream pulley equivalent where it is pushed upward through said open mesh wire conveyor at said breading entrance onto said product-advancing run above said slider plate, said splitter provides a nominally smooth bottom layer of predetermined thickness beneath a food product placed between said splitter trailing legs, after which said side plows fold over breading material from laterally outside the product path over onto the top of said product which is then delivered to said product discharge end.

3. A breading machine as defined in claim 2, wherein said transfer run of said wire conveyor belt includes a belt reverser secured to said frame inwardly of said hopper with respect to a vertical line through said downstream pulley; said conveyor belt passing around said reverser and being released therefrom at approximately the horizontal level of the top of said pulley equivalent at said product-take-away point, about which said conveyor first passes after a generally horizontal short run, and then turns up said breading material elevating run.

4. A breading machine as defined in claim 3, wherein said belt reverser comprises at least one arcuate shape block engaged by said conveyor belt on an arcuate side thereof and from the bottom of which said belt is released.

5. A breading machine as defined in claim 2, including a deflector secured in said hopper between said breading exit, in said product-advancing run of said belt, and said breading material elevating run so constructed and arranged as to spread breading material dropping from said exit across said elevating run, and also to assist in retaining reserve breading material within said hopper.

6. A breading machine as defined in claim 2, including an open mesh wire take-away conveyor comprising a take-away frame supported by said first named frame having a drive pulley at one end and an idler pulley equivalent at the other end and having a take-away run extending from said take-away point outwardly to a product-discharge point and having a return run and a back-up plate closely disposed thereunder, and said back-up plate terminating over said material elevating run; whereby breading material from said take-away conveyor is returned to circulation.

7. A breading machine as defined in claim 6, including a breading material receiving pan fixed closely below the product receiving end of said take-away run and above said return run in position to cushion a product falling from said downstream pulley of said product-advancing run, so that the product is not excessively marked by impact with the said open mesh wire take-away conveyor belt.

8. A breading machine as defined in claim 2, wherein said means for driving said conveyor belt is reversible; whereby at the end of a working period said conveyor belt may be reversed to convey the greater portion of said breading material out of said hopper.

9. A breading machine as defined in claim 2, wherein said frame includes as a unitary structure two parallel vertical conveyor support plates positioned on opposite sides of, and extending the length of, said product-advancing run, said support plates holding said upstream and downstream pulley equivalents and said slider plate and said roof plate being rigidly connected between said support plates and said support plates having parallel vertical downwardly extending ears at the downstream end of said product-advancing run, said ears extending down to said product-take-away point and there supporting said third pulley equivalent between them and there being pivot pins oscillatably supporting said ears in said hopper side walls concentric with said third pulley equivalent; whereby said unitary structure may oscillate about said pivot pins for inspection and cleaning.

10. A breading machine as defined in claim 2, wherein a roof end wall extends from the lower end of said roof upward to said slider plate; and a slot-control plate having a linear lower edge is adjustably mounted on said roof end wall in position to extend downward below said roof plate; and said last-named adjustment permitting said lower edge of said control plate to be fixed parallel to said hopper bottom wall at various distances.

11. A breading machine as defined in claim 2, wherein a tamper plate is mounted in said frame for oscillation about a horizontal line transverse to said product-advancing run and downstream of said side plows converging portion; said tamper plate extending substantially the full width between said plow trailer portions; and said tamper plate having a contour presenting a horizontal straight line engagement to breading material normal to said product-advancing run and on top of said product between said plow trailer portions, to tamp breading material on top of and around a food product.

12. A breading machine as defined in claim 2, in combination with a battering machine mounted above said breading machine and having means for completely coating a food product with batter; and said means having a product release point positioned to discharge said coated product by gravity to a position between said splitter trailing legs of said breading machine.

13. The combination of claim 12, wherein said battering machine includes a batter storage tank; a coating conveyor supported in said tank and having said product release point and a product feed point at opposite ends of said tank; said product release point being vertically above a point intermediate said splitter trailing legs of said breading machine; and means affixed to said breading machine frame holding said battering machine thereabove.

14. The combination of claim 13, wherein said battering machine is substantially within the horizontal perimeter of said breading machine projected upwardly.

15. The combination of claim 13, wherein said coating conveyor comprises a coating conveyor frame enclosed in said storage tank and having two parallel side frame members extending from said product feed point to said product release point and a drive pulley at said release point and two pulley equivalents near the top of said tank, one at said feed point and one upper pulley equivalent at a short distance from said release point and at least one lower pulley equivalent near the bottom of said tank and nearer said feed point, said drive pulley and said pulley equivalents supported in said side frame members, and an endless open mesh wire belt traveling over said drive pulley and said pulley equivalents; a submerger wheel mounted in said side frame members intermediate said product feed and release point for rotation on an axis crosswise of said tank, said wheel having a cylindrical peripheral cover positioned to pass at its lowest point beneath the normal batter level in said tank, said coating conveyor belt having a coating run passing beneath said wheel; means for maintaining said coating conveyor belt under tension; and means for driving said coating conveyor belt and for causing said coating run to travel from said feed point to said release point and for causing a return run to travel from said release point beneath said lower pulley equivalent to said feed point; whereby a product to be coated when placed on said coating conveyor belt near said feed point is carried beneath said wheel and below said batter level then over said upper pulley equivalent to said release point.

16. The combination of claim 15, wherein said storage tank has a flat bottom; said lower pulley equivalent is near said bottom; said tension means comprises counterweight means carried at the end of arm means extending upwardly from said counterweight means, said arm means pivoted at its upper end on said side frame members in position to hold said coating conveyor belt taut with its return run close to said bottom, and said submerger wheel cover is of open wire mesh; whereby said batter material is continuously agitated by said coating conveyor belt traveling through said tank and revolving said wheel and scraping along said tank bottom.

17. The combination of claim 15, including means for maintaining said normal batter level in said tank comprising a reservoir of batter material suspended above said storage tank; said batter reservoir having an outflow tube; and said tube extending downwardly into said tank and having an open end ending at said desired normal batter level in said tank; whereby batter removed from said tank by coated product is automatically replaced up to the capacity of said batter reservoir.

18. A unitary compact battering machine comprising a batter storage tank; a coating conveyor supported in said tank and having a product release point and a product feed point at opposite ends of said tank; said coating conveyor comprising a coating conveyor frame enclosed in said storage tank and having two parallel side frame members extending from said product feed point to said product release point and a drive pulley at said release point and two pulley equivalents near the top of said tank, one at said feed point and one upper pulley equivalent a short distance from said release point and at least one lower pulley equivalent near the bottom of said tank and nearer said feed point, said drive pulley and said pulley equivalents supported in said side frame members, and an endless open mesh wire belt traveling over said drive pulley and said pulley equivalents; a submerger wheel mounted in said side frame members intermediate said product feed and release points for free rotation on an axis crosswise of said tank, said wheel having a cylindrical peripheral cover of open wire mesh positioned to pass at its lowest point beneath the normal batter level in said tank, said coating conveyor belt having a coating run passing beneath and in contact with and driving said wheel; means for maintaining said coating conveyor belt under tension; and means for driving said coating conveyor belt and for causing said coating run to travel from said feed point to said release point and for causing a return run to travel from said release point beneath said lower pulley equivalent to said feed point; whereby a product to be coated when placed on said coating conveyor belt near said feed point is carried beneath said wheel and below said batter level, then over said upper pulley equivalent to said release point.

19. The combination of claim 18, wherein said storage tank has a flat bottom; said lower pulley equivalent is near said bottom; said tension means comprises counterweight means carried at the end of arm means extending upwardly from said counterweight means, said arm means pivoted at its upper end on said side frame members in position to hold said coating conveyor belt taut with its return run close to said bottom; whereby said batter material is continuously agitated by said coating conveyor belt traveling through said tank and revolving said wheel and scraping along said tank bottom.

20. The combination of claim 18, including means for maintaining said normal batter level in said tank comprising a reservoir of batter material suspended above said storage tank; said batter reservoir having an outflow tube; and said tube extending downwardly into said tank and having an open end ending at said desired normal batter level in said tank; whereby batter removed from said tank by coated product is automatically replaced up to the capacity of said batter reservoir.

21. A machine for coating a food product with a finely divided particulate coating material comprising a frame; a generally flat slider plate horizontally fixed in said frame and having a product-input and a product-discharge end; an endless open mesh wire conveyor belt having a product-advancing run extending linearly close above said slider plate and supported in said frame by pulley equivalents, one spaced upstream from said input end and providing a breading entrance in said upstream space, and one spaced downstream from said discharge end and providing a breading exit in said downstream space; means providing a flow of said coating material on said moving belt providing a product path centrally thereof; said means comprising a breading material storage hopper on said frame below said slider plate and having parallel vertical side walls and having a bottom wall which is a flat plate inclined upwardly from a low point spaced below said downstream pulley to a point immediately below said upstream pulley equivalent and having one end wall at the higher end of said bottom wall; a conveyor belt having a linear breading material elevating run in said hopper and traveling between said vertical side walls and close to said inclined bottom wall, said elevating run supported by a pulley equivalent at said low point and by a downstream pulley equivalent near said higher end of said bottom wall; said means also comprising a flat roof plate fixed in said hopper parallel to said bottom wall and spaced thereabove at approximately the level of the top of the breading material being elevated by said conveyor belt, said roof terminating at approximately said product-input end of said slider plate, said roof plate extending between said vertical side walls and with said hopper bottom wall forming a slot which with said belt conveyor elevating run serves to pump said breading material forward and upward through said product-advancing run of said conveyor belt at said breading entrance; means for placing a food product on said product path at said product-input end; and said moving belt advancing said product and said coating material down said path.

* * * * *